Sept. 25, 1951 — C. R. GOLAY — 2,569,161

SIDE DELIVERY TRUCK BODY

Filed Feb. 18, 1948

INVENTOR.
CHARLES R. GOLAY
BY
Pattison, Wright & Pattison

Patented Sept. 25, 1951

2,569,161

UNITED STATES PATENT OFFICE 2,569,161

SIDE DELIVERY TRUCK BODY

Charles R. Golay, Cambridge City, Ind.

Application February 18, 1948, Serial No. 9,189

1 Claim. (Cl. 214—83.14)

This invention relates to new and useful improvements in vehicle bodies and more particularly and specifically to bodies for trailer wagons and like hauling vehicles such as are utilized the year round in agricultural and analogous fields of work.

In daily, year round work the farmer finds a definite need for an all-purpose trailer wagon body in which he may haul his numerous crops as they are harvested or to transport them from place to place for planting. A need is also found for an all-purpose body of the type set forth which has a self, or automatic, discharging type of body. There have been many attempts made to perfect a satisfactory self-discharging body for such uses as set forth but all such attempts centered around dumping bodies which discharge from their ends. The use of an end discharging dumping body has been found very unsatisfactory because the majority of such bodies are supported on four wheels thereby causing the vehicle to be extremely awkward to handle when backing it up to a confined discharge receiving area such as an elevator, storage crib or the like.

The primary object of this invention resides in the provision of a side discharging body which allows the body to be moved forwardly to the desired point of discharge, thereby eliminating the tedious and difficult task of backing the body to position its rear end at the desired point of discharge.

Another important object of this invention lies in the provision of a side discharging hauling body which is provided with a conveyor type discharging element which is fed material from portions of the body remote thereto by automatic or manually operated apparatus. This form of body permits faster unloading of the body contents; lessens the amount of damage to the discharged material; and simplifies the overall task of handling and discharging the material and of handling and controlling the apparatus.

Another and further object of this invention is the provision of a vehicle body of the character set forth which is of an extremely simple and durable design and construction thus making the cost of manufacture and installation extremely low.

Still further improvements and advantages of this invention will readily appear to those skilled in the art when the following description is read in the light of the accompanying drawings.

Figure 1:
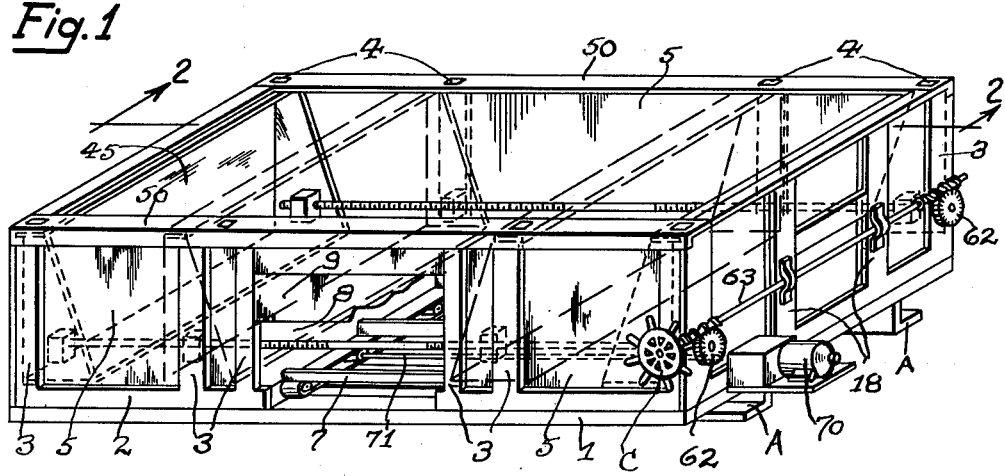
Fig. 1 is a perspective view of a preferred body form, with an intermediate position of the movable end walls being shown in dotted line.

The body comprises a pair of base rails 2 which extend the length of the sill along the upper face thereof, and these base rails are provided with spaced, upright posts 3. These posts are each provided with a stake receiving aperture 4 in their top face to permit a cover supporting stake to be removably securely and vertically supported thereabove. A pair of facing panels 5 are placed between those pairs of adjacent posts bordering the central section of each of the body sides.

A floor portion 6 is supported transverse the body sill centrally of the body length. This floor lies in the same plane as the body sill, and an endless type conveyor 7 is disposed on the floor to move transverse the body toward a discharge outlet 8 formed in facing panel 5 at one side of the body. A door 9, of a sliding or hinged type is provided to close the discharge outlet 8.

A pair of floor sections 15 and 16 are disposed one in each end of the body. These floors completely cover the bottom of the body from the conveyor floor portion 6 to the base rails traversing each end of the body.

The body end walls 45 are separate from the end base rails 17 and end upright posts 18. The end walls are slidable longitudinal of the body over the floor sections 15 and 16 beneath a horizontal rail 50 which is formed by turning in the upper edges of the side panels 5 which are employed to enclose the entire body by their attachment between each pair of adjacent posts 3.

Each of the end walls 45 is provided at each of its ends with a triangular shaped side plate 51 which lies parallel to the inner face of the side panels 5. Foot or bottom plates 53 extend between the lower ends of the plates 51 and are disposed immediately above the floor sections over which they slide.

On the inner face of each of the body end wall side plates 51, and at a spaced vertical distance above the foot plate thereof, there is secured a horizontally disposed threaded bearing 60 having an axis which extends longitudinal the body.

An elongated jack screw 61 extends throughout the length of each side of the body and each extends through the two bearings carried by those plates 51 which are on the same side of the body. These screws extend through one body end wall of the wagon and externally of the body are each fitted with a gear wheel 62. These gears are each operatively geared to remote threaded ends of an elongated drive shaft 63 which is supported and extends horizontally transverse the end of the body. This elongated drive shaft is operatively geared for rotation to a manually operated hand wheel C, or it may be geared to any suitable mechanical power source such as a small electric motor or the like.

From the foregoing it will be readily seen that rotation of the drive shaft 63 will cause a rotation of the jack screws 61 thereby causing the body end walls to move toward or away from the conveyor 7, depending on the direction of rotation of the drive shaft and jack screws.

Figure 2:
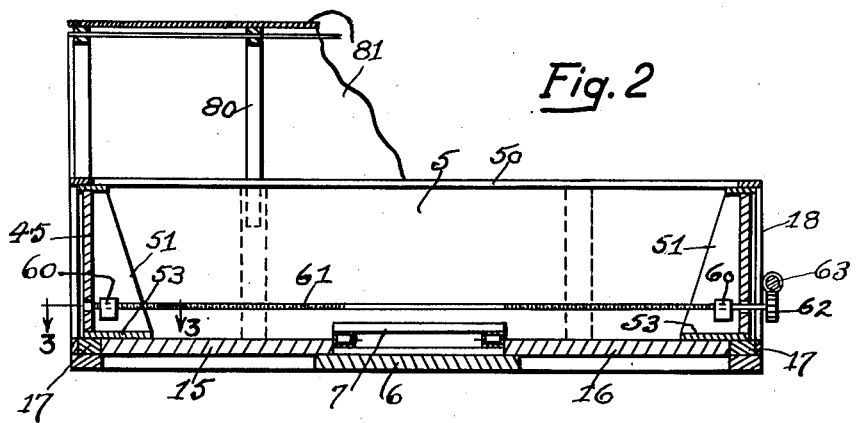
Fig. 2 is a vertical sectional view taken on line 2—2 of Fig. 1 looking in the direction indicated by arrows.
Figure 3:
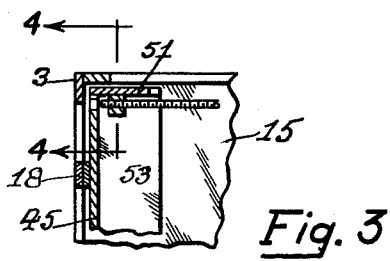
Fig. 3 is a fragmentary horizontal section taken on line 3—3 of Fig. 2 looking in the direction indicated by arrows.
Figure 4:
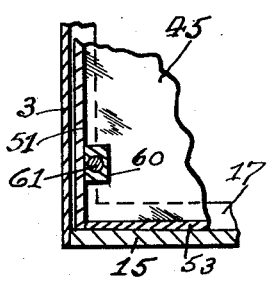
Fig. 4 is a vertical section taken on line 4—4 of Fig. 3 looking in the direction indicated by arrows Referring now to the accompanying drawings in which like characters indicate similar parts throughout, A designates the frame of the vehicle, comprising, parallel, spaced girders. A rectangular body sill 1 is rigidly supported on the frame A and this sill, in turn, supports the body.

A small motor 70, or like power source, is provided to which the conveyor 7 is operatively geared by an elongated drive shaft 71, thereby enabling selective operation of the conveyor for unloading the body. The stake apertures 4 are designed to securely support arcuate stakes 80, as illustrated in Fig. 2, so that a tarpaulin cover 81, or the like, may be supported over the body to retain hay, silage and like characterized materials which would otherwise tend to escape when they are loaded into the wagon in the conventional manner of being blown thereinto.

From the foregoing it will be seen that an improved and desirable all-purpose vehicle body has been provided which has in addition to the previously described advantages, a means for automatic side discharge which includes means for moving the contents of the wagon to said discharge. It will also be noted that a vehicle body has been provided which is extremely practical, durable and relatively inexpensive.

Having described the construction and function of the invention, what I desire to claim in Letters Patent is:

What I claim is:

A hauling vehicle comprising, a wheel supported vehicle frame, a body supported on the frame, a discharge outlet in the side of the body intermediate the body length, a closure for said outlet, a conveyor horizontally disposed transverse the body floor in alignment with the outlet, a substantially vertically extending pusher member traversing each of the two body portions and separated by the conveyor, a pair of elongated jack screws extending longitudinally adjacent each side wall of the body, each of the pusher members having threaded engagement at their vertical edges with the jack screws, and said screws being operatively connected to a power source for progressing the pusher members toward and away from the conveyor.

CHARLES R. GOLAY.

REFERENCES CITED

The following references are of record in the file of this patent:

UNITED STATES PATENTS

| Number | Name | Date |
| --- | --- | --- |
| 725,095 | Kruetler et al. | Apr. 14, 1903 |
| 837,170 | Wishon | Nov. 27, 1906 |
| 1,078,068 | Sigismund | Nov. 11, 1913 |
| 1,515,328 | Barkmann et al. | Nov. 11, 1924 |
| 1,928,859 | Kutscha | Oct. 3, 1933 |
| 2,267,526 | Kutscha | Dec. 23, 1941 |
| 2,321,168 | Tognetti | June 8, 1943 |
| 2,356,434 | Russell | Aug. 22, 1944 |